(12) United States Patent
Jergess et al.

(10) Patent No.: US 10,343,728 B2
(45) Date of Patent: Jul. 9, 2019

(54) POWERED HINGE ASSEMBLY AND POWERED TAILGATE ASSEMBLY INCORPORATING THAT POWERED HINGE ASSEMBLY

(71) Applicant: FORD GLOBAL TECHNOLOGIES, LLC, Dearborn, MI (US)

(72) Inventors: Rafic Jergess, Warren, MI (US); Spencer Monroe Dinkins, III, Rockester Hills, MI (US); Adrian Nania, Rochester, MI (US)

(73) Assignee: Ford Global Technolgies, LLC, Dearborn, MI (US)

( * ) Notice: Subject to any disclaimer, the term of this patent is extended or adjusted under 35 U.S.C. 154(b) by 235 days.

(21) Appl. No.: 15/434,878

(22) Filed: Feb. 16, 2017

(65) Prior Publication Data

US 2018/0229779 A1 Aug. 16, 2018

(51) Int. Cl.
*E06B 7/00* (2006.01)
*B62D 33/027* (2006.01)
*B62D 33/03* (2006.01)
*E05D 7/10* (2006.01)
*E05F 15/614* (2015.01)
*E05F 15/77* (2015.01)

(52) U.S. Cl.
CPC ......... *B62D 33/0273* (2013.01); *B62D 33/03* (2013.01); *E05D 7/1072* (2013.01); *E05F 15/614* (2015.01); *E05F 15/77* (2015.01); *E05Y 2201/622* (2013.01); *E05Y 2400/336* (2013.01); *E05Y 2600/46* (2013.01); *E05Y 2900/544* (2013.01)

(58) Field of Classification Search
CPC ..... B62D 33/0273; B62D 33/03; E05F 15/77; E05F 15/611; E05F 15/00; E05F 15/70; E05F 1/10; E05D 3/02; E05D 5/062; E05D 5/128; E05D 3/00; E05Y 2900/546; E05Y 2201/622; E05Y 2400/85; E05Y 2400/44; E05Y 2201/43; E05Y 2201/424; E05Y 2400/30; Y10T 16/554; Y10T 16/54
USPC ........ 49/70, 31, 349, 324, 334; 16/319, 382; 296/146.4

See application file for complete search history.

(56) References Cited

U.S. PATENT DOCUMENTS

| 5,004,287 A | 4/1991 | Doyle |
| 5,352,088 A | 10/1994 | Denvir |
| 5,415,058 A | 5/1995 | Young et al. |
| 5,823,022 A | 10/1998 | Barker |

(Continued)

FOREIGN PATENT DOCUMENTS

DE 102015107349 A1 7/2016

OTHER PUBLICATIONS

English Machine Translation of DE102015107349A1.
Non-final Office Action dated Sep. 21, 2018 for U.S. Appl. No. 15/446,269, filed Mar. 1, 2017.

*Primary Examiner* — Chi Q Nguyen
(74) *Attorney, Agent, or Firm* — Jason Rogers; Vichit Chea; King & Schickli, PLLC (57) ABSTRACT

A powered hinge assembly includes a first gate hinge feature, a drive unit connected to the first gate hinge feature and a controller configured to displace the first gate hinge feature to an installation position upon connection to a power source. A powered tailgate assembly, incorporating the powered hinge assembly, and a method of installing a tailgate are also disclosed.

20 Claims, 9 Drawing Sheets

(56) References Cited

U.S. PATENT DOCUMENTS

| | | | |
|---|---|---|---|
| 6,357,813 B1* | 3/2002 | Vandeberghe | B62D 33/0273 296/146.4 |
| 6,398,288 B1* | 6/2002 | Yuge | E05F 15/627 296/146.4 |
| 6,425,205 B2 | 7/2002 | Wygle et al. | |
| 6,520,557 B2* | 2/2003 | Benthaus | E05F 1/1091 296/107.08 |
| 6,637,796 B1 | 10/2003 | Westerdale et al. | |
| 6,719,356 B2 | 4/2004 | Cleland et al. | |
| 6,764,122 B2 | 7/2004 | Kharod | |
| 6,814,392 B1* | 11/2004 | Tomaszewski | E05F 15/622 296/146.4 |
| 6,964,449 B2* | 11/2005 | Takeda | E05F 15/63 296/106 |
| 7,069,695 B2* | 7/2006 | Hattori | E05F 15/619 296/146.4 |
| 7,258,373 B2 | 8/2007 | Plett et al. | |
| 7,287,803 B2 | 10/2007 | Koneval et al. | |
| 7,484,784 B2 | 2/2009 | Ohly | |
| 7,500,706 B2 | 3/2009 | Anderson et al. | |
| 7,533,920 B2 | 5/2009 | Ohly | |
| 7,549,691 B2 | 6/2009 | Schulte et al. | |
| 8,008,910 B2 | 8/2011 | Booth et al. | |
| 8,696,046 B2 | 4/2014 | Sackett | |
| 9,097,045 B2 | 8/2015 | Hausler et al. | |
| 9,234,378 B2 | 1/2016 | Hansen | |
| 2004/0040213 A1 | 3/2004 | McCarthy-Garland et al. | |
| 2006/0181108 A1 | 8/2006 | Cleland et al. | |
| 2007/0132264 A1* | 6/2007 | Koneval | B62D 33/0273 296/57.1 |
| 2008/0054667 A1* | 3/2008 | Ohly | B62D 33/0273 296/57.1 |
| 2012/0272479 A1 | 11/2012 | Rasel et al. | |
| 2015/0315837 A1* | 11/2015 | Salmon | E05F 5/00 74/405 |

* cited by examiner

POWERED HINGE ASSEMBLY AND POWERED TAILGATE ASSEMBLY INCORPORATING THAT POWERED HINGE ASSEMBLY

TECHNICAL FIELD

This document relates generally to the motor vehicle equipment field and, more particularly, to a new and improved powered hinge assembly, to a powered tailgate assembly incorporating that powered hinge assembly as well as to a method of installing a powered tailgate onto a motor vehicle.

BACKGROUND

This document relates to a powered hinge assembly as well as to a powered tailgate assembly incorporating that powered hinge assembly. The powered hinge assembly includes a drive unit having an electrical clutch and a drive motor responsive to a controller. The powered hinge assembly and powered tailgate assembly allow for both manual and automated raising and lowering of the tailgate. Advantageously, the powered hinge assembly incorporates an absolute position sensor for monitoring the angular orientation of the powered hinge assembly. The controller of the powered hinge assembly is configured to displace the first gate hinge feature into an installation position upon connection to a power source as is done when the tailgate is installed on the motor vehicle. This ensures that the powered hinge assembly is properly oriented for trouble-free and efficient installation.

SUMMARY

In accordance with the purposes and benefits described herein, a powered hinge assembly is provided for a tailgate. That powered hinge assembly comprises a first gate hinge feature, a drive unit connected to the first gate hinge feature and a controller. That controller is configured to displace the first gate hinge feature to an installation position upon connection to a power source as is done when preparing to install the tailgate on a motor vehicle.

The drive unit may include a drive motor connected to the first gate hinge feature through a normally dis-engaged clutch allowing manual operation of the tailgate: that is raising and lowering of the tailgate by hand. Further, the controller may be configured to engage the clutch and operate the driver motor in order to automatically raise or lower the tailgate in response to a command signal.

The first gate hinge feature may include a drive cup, a fixed cup and an integrated drive cup position sensor. The drive cup position sensor monitors a current position of the drive cup and provides current drive cup position data to the controller. The fixed cup may include a cylindrical wall having a hinge pin passage and the drive cup may include a hinge pin socket having an open end. The output of the drive unit is connected to the drive cup. The open end of the hinge pin socket is aligned with the hinge pin passage in the cylindrical wall when the first gate hinge feature is in the installation position.

The powered hinge assembly may also include a first hinge pin. That first hinge pin may be carried on the motor vehicle body side adjacent the tailgate. The first hinge pin is installed in the hinge pin socket by passing through the aligned hinge pin passage and open end when the first hinge feature is in the installation position.

In accordance with an additional aspect, a powered tailgate assembly is provided. That powered tailgate assembly comprises a tailgate having a first end and a second end, a powered hinge assembly at the first end of the tailgate and a torque hinge assembly at the second end of the tailgate. The powered hinge assembly includes a first gate hinge feature, a drive unit connected to the first gate hinge feature and a controller. The controller is configured to displace the first gate hinge feature to an installation position when first connected to a power source such as is done when installing the tailgate onto a motor vehicle.

The drive unit may include a drive motor connected to the first gate hinge feature through a normally dis-engaged clutch allowing manual operation of the tailgate. The controller may be configured to engage the clutch and operate the drive motor in order to automatically raise or lower the tailgate in response to a command signal.

The first gate hinge feature may include a drive cup received within a fixed cup. The fixed cup may include a cylindrical wall having a hinge pin passage while the drive cup may include a first hinge pin socket having an open end. An output of the drive unit may be connected through the drive cup. The open end may be aligned with the hinge pin passage when the first gate hinge feature is in the installation position. In addition, the first gate hinge feature may include a drive cup position sensor that monitors a current position of the drive cup and provides current drive cup position data to the controller The torque hinge assembly includes a second hinge pin socket carried on a torque rod. That torque rod functions to bias the tailgate toward a closed position, effectively offsetting some weight of the tailgate when the tailgate is raised toward that closed position, thereby reducing closing effort.

The powered tailgate assembly also includes a first fixed hinge pin carried on a motor vehicle body adjacent a first end of the tailgate and received and held in the first hinge pin socket of the drive cup. Further, the powered tailgate assembly may also include a second, fixed hinge pin carried on the motor vehicle body adjacent a second end of the tailgate and received and held in the second hinge pin socket.

In accordance with yet another aspect, a method is provided of installing a powered tailgate onto a motor vehicle. That method comprises the steps of configuring a controller to displace a first gate hinge feature of a powered hinge assembly to an installation position upon first connection to a power source and orienting, by the controller, the first gate hinge feature into the installation position.

The method may further include the steps of: (a) monitoring, by absolute position sensor, a current position of a drive cup of the first hinge feature, (b) configuring the controller to respond to the current drive cup position data received from the absolute position sensor and (c) aligning, by the controller, an open end of the first hinge pin socket of the drive cup with the hinge pin passage in the first gate hinge feature when orienting the first gate hinge feature into the installation position.

Further, the method may include the step of assembling a torque hinge assembly at a second end of the tailgate by inserting the second hinge pin into the second hinge pin socket. In addition, the method may include assembling the powered hinge assembly by passing the first hinge pin through the hinge pin passage and the open end in order to insert the first hinge pin into the first hinge pin socket of the drive cup.

Still further, the method may include assembling the torque hinge assembly at a first angle or orientation of the tailgate with respect to the motor vehicle and assembling the powered hinge assembly at a second angle or orientation of the tailgate with respect to the motor vehicle.

In the following description, there are shown and described several preferred embodiments of the powered hinge assembly, the powered tailgate assembly as well as the related method of installing a powered tailgate onto a motor vehicle. As it should be realized, the powered hinge assembly, the powered tailgate assembly and related method are capable of other, different embodiments and their several details are capable of modification in various, obvious aspects all without departing from the powered hinge assembly, the powered tailgate assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the powered hinge assembly, the powered tailgate assembly and related tailgate installation method and together with the description serve to explain certain principles thereof. In the drawing figures.

Reference will now be made in detail to the present preferred embodiments of the powered hinge assembly and powered tailgate assembly, examples of which are illustrated in the accompanying drawing figures.

DETAILED DESCRIPTION

Figure 1:
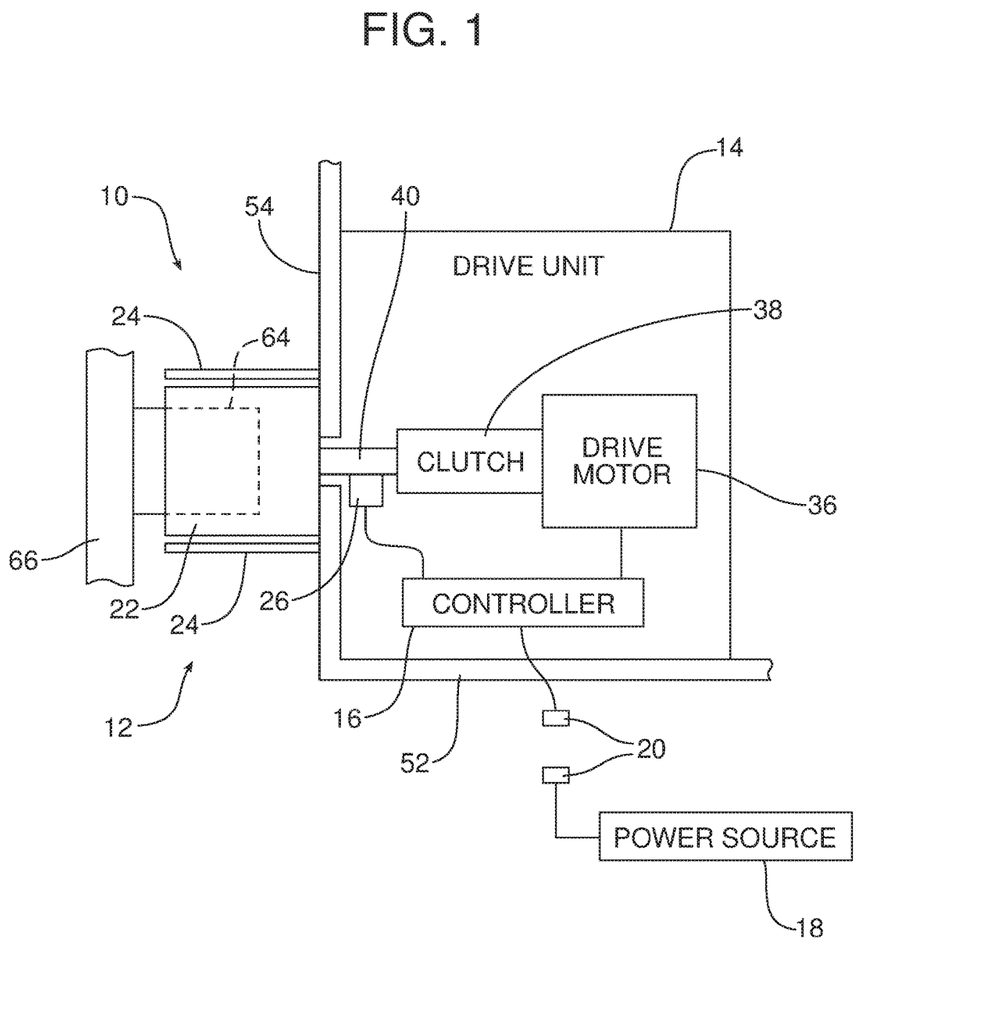
FIG. 1 is a schematic block diagram of the powered hinge assembly.
Figure 2:
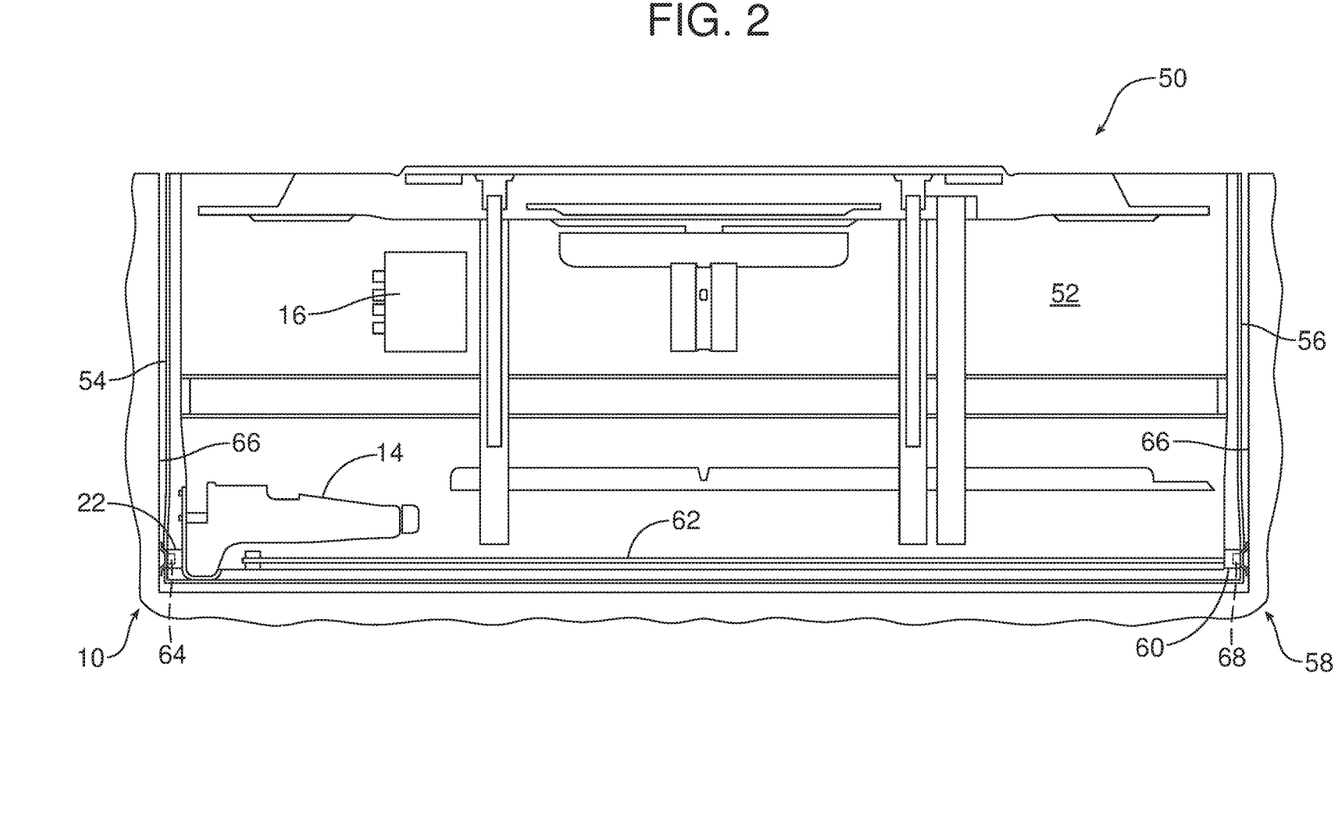
FIG. 2 is a schematic plan illustration of the powered tailgate assembly incorporating the powered hinge assembly illustrated in FIG. 1.

Reference is now made to FIG. 1 which schematically illustrates the powered hinge assembly 10. That powered hinge assembly 10 includes a first gate hinge feature 12, a drive unit 14 connected to the first gate hinge feature and a controller 16. The controller 16 may comprise a computing device such as a dedicated microprocessor or electronic control unit (ECU) operating in accordance with instructions from appropriate control software. Thus, the controller 16 may comprise one or more processors, one or more memories and one or more network interfaces all in communication with each other over a communication bus. In the illustrated embodiment, the controller 16 is part of the drive unit 14. Here, it should be appreciated that the controller 16 could be a component separate from the drive unit 14 in some possible embodiments as illustrated in FIG. 2.

As described in greater detail below, the controller 16 is configured to displace the first gate hinge feature 12 to an installation position upon connection of the controller 16 to a power source 18 by means of the plug-in connector 20.

Figure 3A:
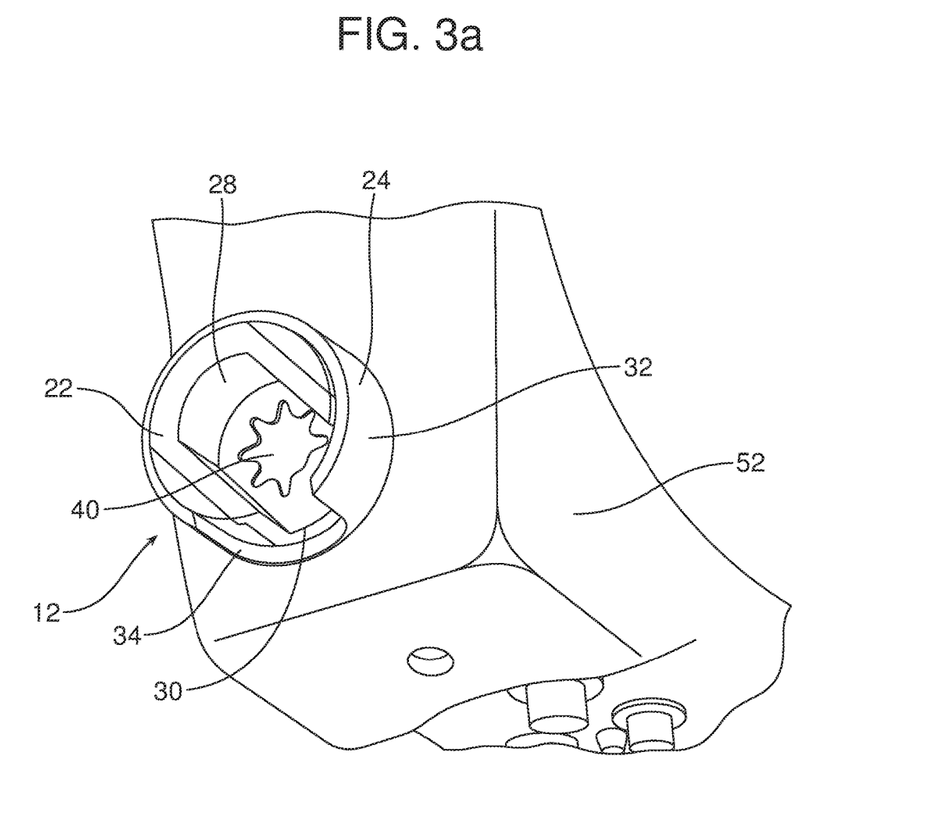
FIG. 3a is a detailed perspective view of the first gate hinge feature of the powered hinge assembly showing the open end of the drive cup misaligned with the first hinge pin passage in the cylindrical wall of the encircling fixed cup.
Figure 3B:
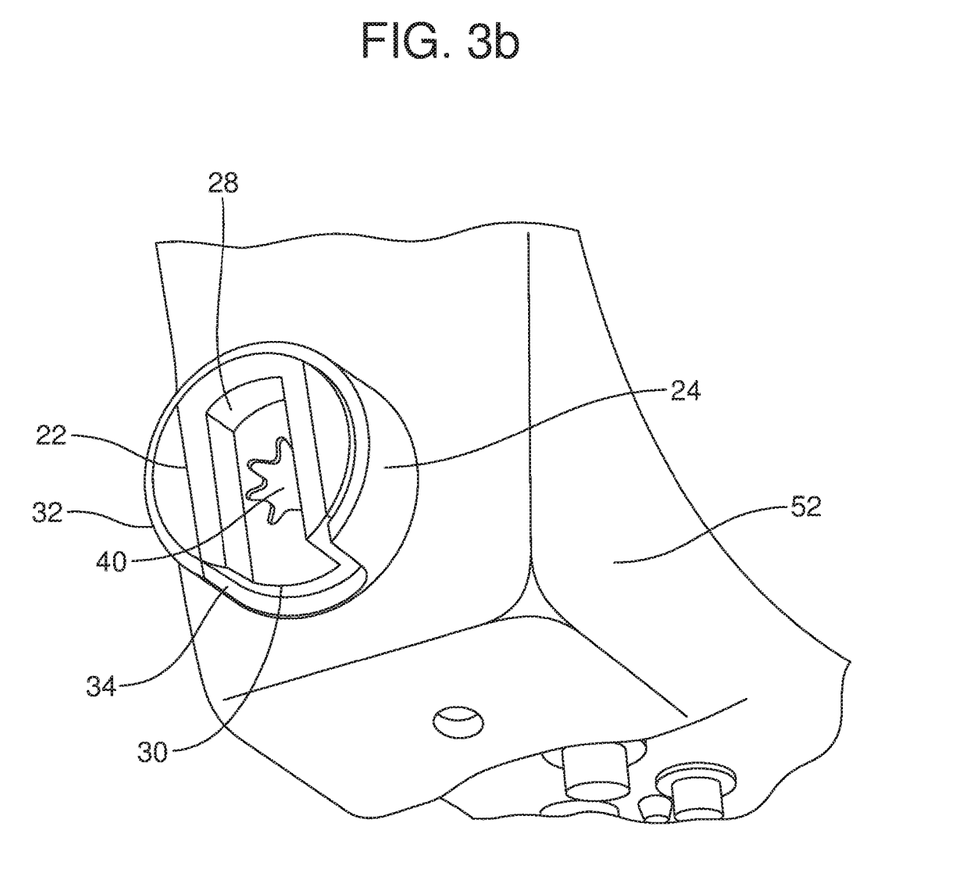
FIG. 3b is a view similar to FIG. 3a but showing the open end of the first hinge pin socket of the drive cup aligned with the hinge pin passage provided in the cylindrical wall of the fixed cup to allow easy installation of the tailgate on the motor vehicle.

As best illustrated in FIGS. 1, 3a and 3b, the first gate hinge feature 12 includes a drive cup 22, a fixed cup 24 and an integrated drive cup position sensor 26. The drive cup position sensor 26 may comprise an absolute position sensor or a rotary position sensor. Such a sensor is available from Microelectronic Integrated Systems as a model MLX90316 rotary position sensor. This is just one example and should not be considered limiting in scope. Potentiometers, Hall effect or other types of sensors may be utilized. As best illustrated in FIGS. 3a and 3b, the drive cup 22 includes a hinge pin socket 28 having an open end 30. The fixed cup 24 includes a cylindrical wall 32 having a hinge pin passage 34.

As illustrated in FIG. 1, in addition to the controller 16, the drive unit 14 includes a drive motor 36, a normally dis-engaged clutch 38 and an output 40 splined to or otherwise connected to the drive cup 22. Here it should be appreciated that the integrated drive cup position sensor 26 may be keyed to or otherwise connected to the output 40 or the drive cup 22. The drive up position sensor 26 is configured to monitor a current position of the drive cup 22 and provide current drive cup position data to the controller 16.

Figure 4:
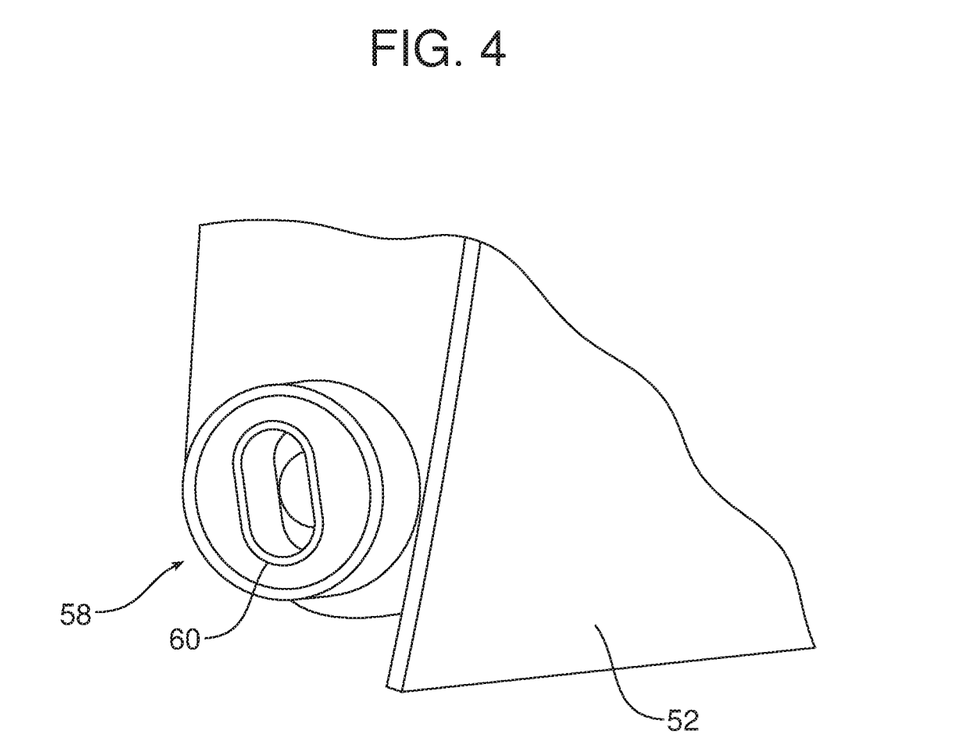
FIG. 4 is a detailed perspective view of the second hinge pin socket of the torque hinge assembly.

Reference is now made to FIG. 2 illustrating a powered tailgate assembly 50 that incorporates the powered hinge assembly 10 illustrated in FIG. 1. As illustrated in FIG. 2, the powered tailgate assembly 50 includes a tailgate 52 having a first end 54 and a second end 56. The powered hinge assembly 10 is provided at the first end 54 of the tailgate. A torque hinge assembly 58 is provided at the second end 56 of the tailgate 52. In the illustrated embodiment, the torque hinge assembly 58 includes a second hinge pin socket 60 carried on a torque rod 62. See also FIG. 4. Here it should be appreciated that the first hinge pin socket 28 of the powered hinge assembly 10 and the second hinge pin socket 60 of the torque hinge assembly 58 are coaxial and together, they define the pivot axis for the tailgate 52 when it is mounted to a motor vehicle.

As also illustrated in FIG. 2, the powered hinge assembly 10 also includes a first hinge pin 64 carried on or fixed to the motor vehicle body 66 adjacent the first end 54 of the tailgate 52. Similarly, the torque hinge assembly 58 includes a second hinge pin 68 carried on or fixed to the motor vehicle body 66 adjacent the second end 56 of the tailgate 52. When the tailgate 52 is properly installed on the motor vehicle, the first hinge pin 64 is received and held in the first hinge pin socket 28 of the drive cup 22 of the powered hinge assembly 10 while the second hinge pin 68 is received and held in the second hinge pin socket 60 of the torque hinge assembly 58.

Figure 5A:
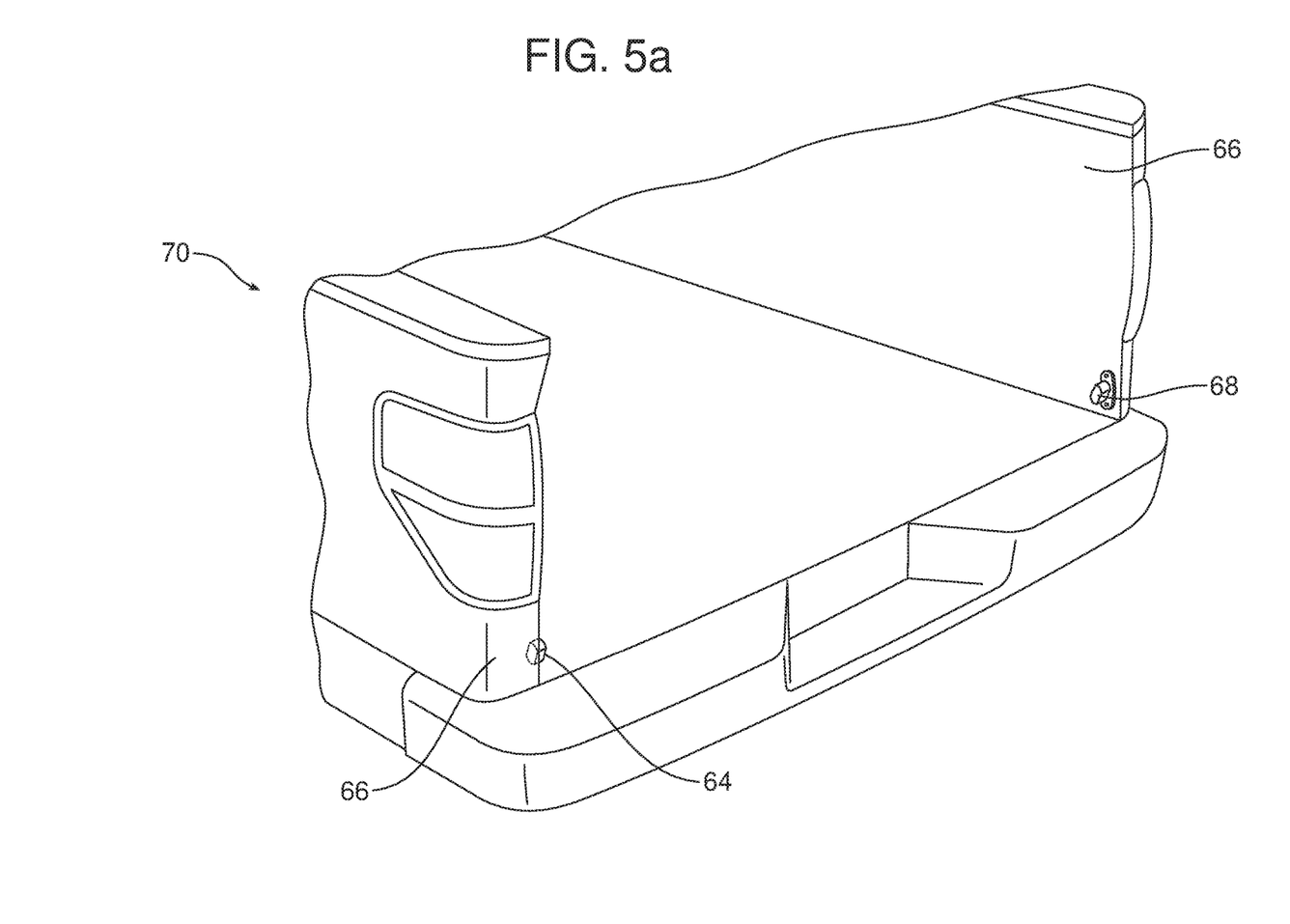
FIGS. 5a-5d are a series of illustrations showing how the tailgate is installed on the motor vehicle.

Reference is now made to FIGS. 5a-5d which illustrate a method of installing a tailgate 52 onto a motor vehicle. As illustrated in FIG. 5a, the tailgate 52 is detached from the motor vehicle 70 leaving the first hinge pin 64 and the second, opposed hinge pin 68 on the motor vehicle body side 66 exposed.

Figure 5B:
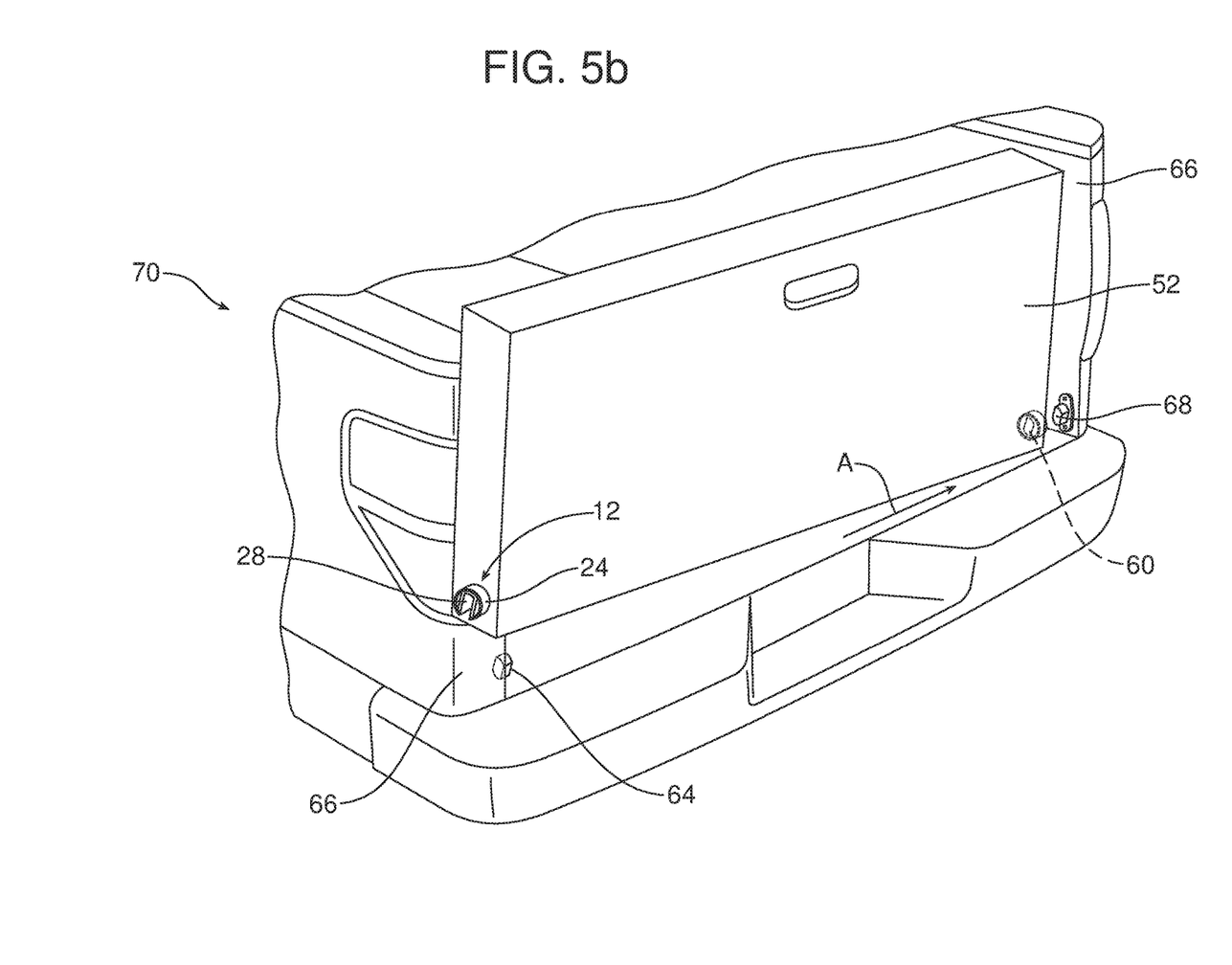
Figure 5C:
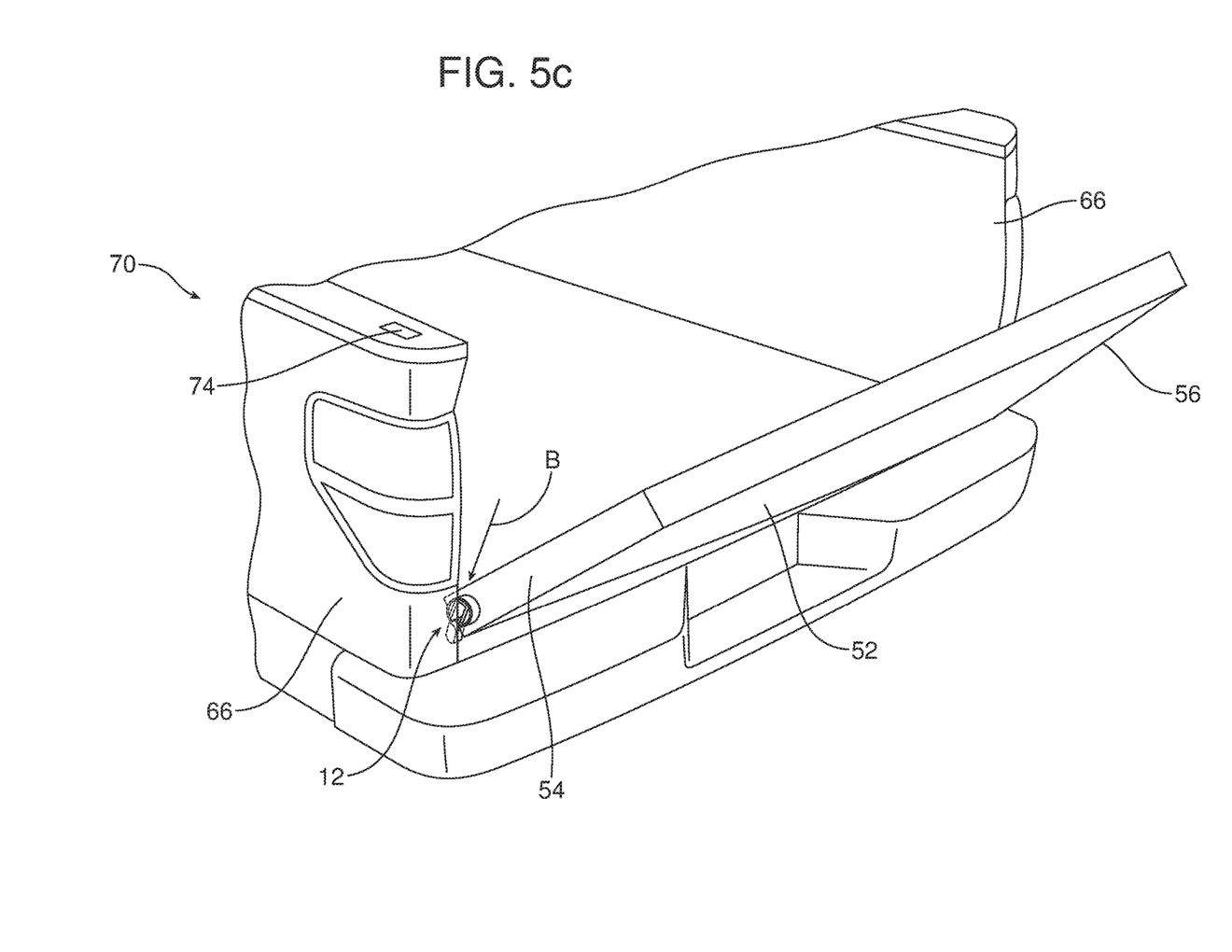
Figure 5D:
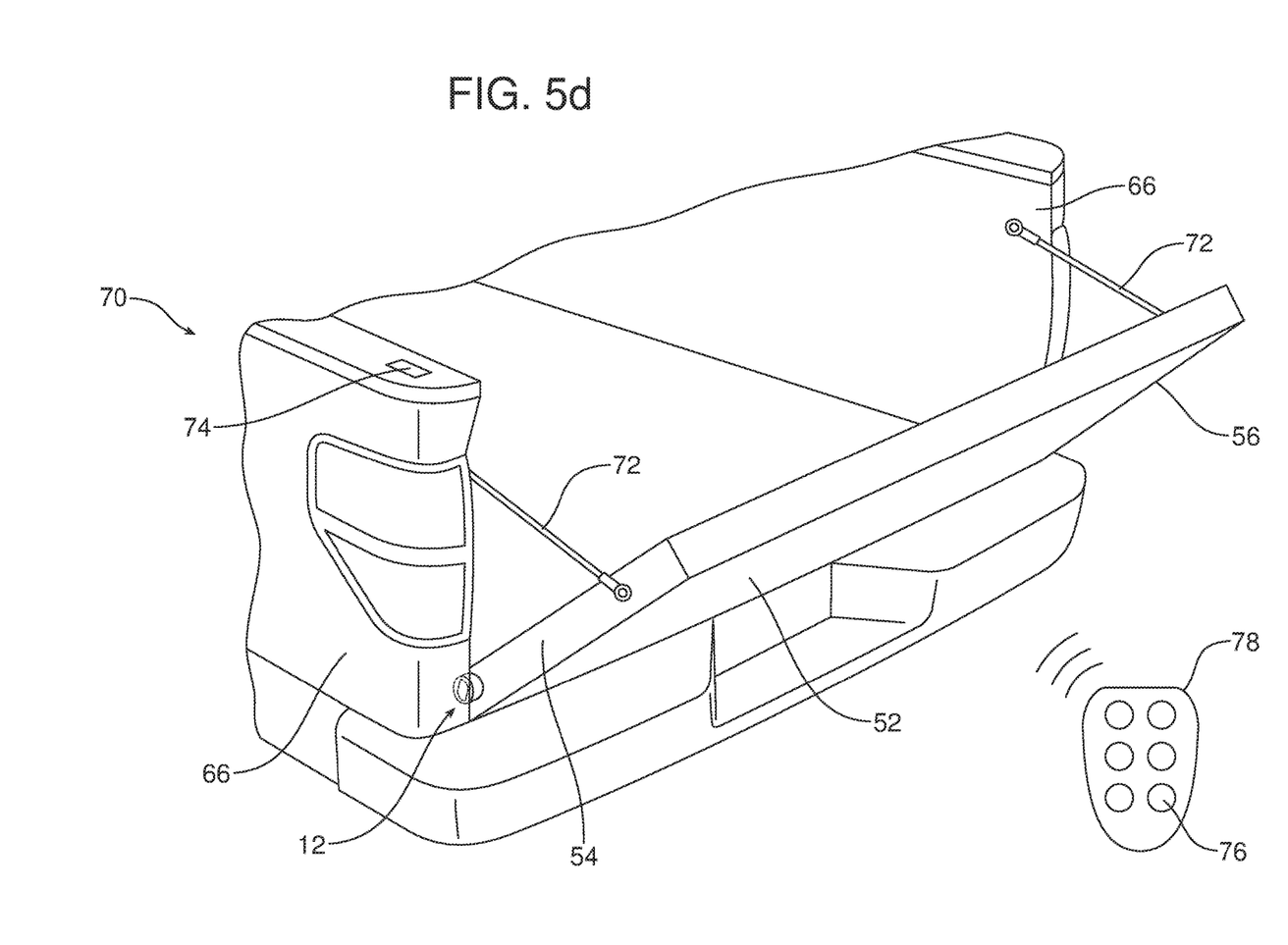

As illustrated in FIG. 5b, the method of installing the tailgate 52 includes assembling the torque hinge assembly 58 at the second end 56 of the tailgate 52 by inserting the second hinge pin socket 60 over the second hinge pin 68. This is done by positioning the tailgate 52 at a first angular orientation of about 80° with respect to horizontal and 10° with respect to vertical and aligning the second hinge pin socket 60 on the end of the now-detensioned torque rod 62 with the second hinge pin 68. The tailgate 52 is then shifted laterally in the direction of action arrow A to insert the second hinge pin 68 into the second hinge pin socket 60 or, stated another way, nest the second hinge pin socket 60 over the second hinge pin 68.

The method of installation also includes configuring the controller 16 to displace the first gate hinge feature 12 of the powered hinge assembly 10 to an installation position upon connection to a power source 18. More specifically, either prior to or after assembling the torque hinge assembly 58 as described above, an individual connects the two halves of the connector 20 directing power from the power source 18 of the motor vehicle 70 to the controller 16. The controller 16 is configured to displace the first gate hinge feature 12 of the powered hinge assembly 10 to an installation position immediately following power up if it is not already in the installation position. Thus, controller 16 sends an appropriate control signal to the clutch 38 engaging the clutch, and to the drive motor 36 to drive the drive cup 22 from the misaligned position illustrated in FIG. 3a to the installation position illustrated in FIG. 3b wherein the open end 30 of the hinge pin socket 28 on the drive cup 22 is aligned with the hinge pin passage 34 in the cylindrical wall 32 of the fixed cup 24. The integrated drive cup position sensor 26 ensures the detection and correction of any misalignment as well as the proper orientation of the drive cup 22 in the installation position through communication of hinge drive cup position data to the controller 16.

The powered hinge assembly 10 is then assembled at a second angular orientation of the tailgate 52 wherein the tailgate forms an included angle of approximately 45° with the vertical and the horizontal. Note FIG. 5c. At this angular orientation, the tailgate 52 is moved in the direction of action arrow B so that the aligned hinge pin passage 34 and open end 30 of the first gate hinge feature 12 overlie the first hinge pin 64 and that first hinge pin is then passed through the hinge pin passage 34 and the open end 30 and installed in the hinge pin socket 28 by lowering the tailgate into position. The stay cables 72 are connected to the tailgate 52 and the operator may then manually lower or close the tailgate 52. Alternatively, the tailgate 52 may be automatically lowered or closed by means of the drive unit 14 when the controller 16 responds to a command signal generated utilizing operator control switches 74 provided, for example, on a sidewall 66 of the motor vehicle or appropriate control buttons 76 on a key fob 78 of the motor vehicle. In still other embodiments of motor vehicles appropriately equipped, voice commands may be utilized for this purpose.

As should be appreciated, the clutch 38 is only engaged when the appropriate command has been received by the controller 16 to raise or lower the tailgate utilizing the drive unit 14. At all other times, the clutch 38 remains dis-engaged to allow manual raising and lowering of the tailgate.

When one wishes to again remove the tailgate 52 from the motor vehicle, one may lower the tailgate with the appropriate "lower" command from the switches 74 or control buttons 76 of the key fob 78. Next, the connector 20 is disconnected so that the controller 16 is disconnected from the power source 18. Next, one manually raises the tailgate 52 to an angular orientation of about 45° and the left and right side stay cables 72 are disconnected. Next, the first end 54 of the tailgate is lifted, the aligned open end 30 of the hinge pin socket 28 and hinge pin passage 34 allowing the removal of the first gate hinge feature 12 from the first hinge pin 64.

Once the powered hinge assembly 10 has been disassembled or disconnected, the lift gate 52 is reoriented at an angle of approximately 80° so as to de-tension the torque rod 62. The tailgate 52 is then pulled toward the first end 54 in a cross-car direction (opposite to action arrow A in FIG. 5b) so as to clear the vehicle box and pull the second hinge pin socket 60 off the second hinge pin 68 thereby fully disengaging the tailgate 52 from the motor vehicle 70.

The powered hinge assembly 10 and the powered tailgate assembly 50 provide a number of benefits and advantages. They provide for seamless manual and automated control for the raising and lowering of the tailgate 52 on the motor vehicle 70. When the tailgate 52 is disconnected from the motor vehicle, the normally dis-engaged clutch 38 may allow the drive 22 to rotate with respect to the fixed cup 24 so that the open end 30 of the hinge pin socket 28 becomes misaligned with the hinge pin passage 34 in the cylindrical wall 32 of the fixed cup 24. This could interfere or even prevent reinstallation of the tailgate 52 on the pickup truck 70 if that misalignment remains undetected and uncorrected. In order to avoid this issue and provide easy and efficient reinstallation, the controller 16 of the drive unit 14 is configured to automatically displace the drive cup 22 to an installation position where the open end 30 and hinge pin passage 34 are fully aligned for ease of installation. This "installation reset" is done automatically at power up when the controller 16 is connected to the power source 18 by connection of the wiring harness connector 20.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A powered hinge assembly for a tailgate, comprising:
a gate hinge feature;
a drive unit connected to said gate hinge feature; and
a controller configured to displace said gate hinge feature to an installation position upon connection to a power source.

2. The powered hinge assembly of claim 1, wherein said drive unit includes a drive motor connected to said gate hinge feature through a normally dis-engaged clutch allowing manual operation of said tailgate.

3. The powered hinge assembly of claim 2, wherein said controller is configured to engage said clutch and operate said drive motor in order to automatically raise or lower said tailgate in response to a command signal.

4. The powered hinge assembly of claim 3, wherein said gate hinge feature includes a drive cup, a fixed cup and a drive cup position sensor, said drive cup position sensor monitoring a current position of said drive cup and providing current drive cup position data to said controller.

5. The powered hinge assembly of claim 4, wherein said fixed cup includes a cylindrical wall having a hinge pin passage and said drive cup includes a hinge pin socket having an open end.

6. The powered hinge assembly of claim 5, wherein an output of said drive unit is connected to said drive cup and said open end is aligned with said hinge pin passage when said gate hinge feature is in said installation position.

7. The powered hinge assembly of claim 6, further including a hinge pin carried on a motor vehicle body side adjacent said tailgate, said hinge pin being installed in said hinge pin socket by passing through said hinge pin passage and said open end when said gate hinge feature is in said installation position.

8. A powered tailgate assembly, comprising:
a tailgate having a first end and a second end;
a powered hinge assembly at said first end of said tailgate, said powered hinge assembly including a gate hinge feature, a drive unit connected to said gate hinge feature and a controller configured to displace said gate hinge feature to an installation position upon connection to a power source; and
a torque hinge assembly at said second end of said tailgate.

9. The powered tailgate assembly of claim 8, wherein said drive unit includes a drive motor connected to said gate hinge feature through a normally dis-engaged clutch allowing manual operation of said tailgate.

10. The powered tailgate assembly of claim 9, wherein said controller is configured to engage said clutch and operate said drive motor in order to automatically raise or lower said tailgate in response to a command signal.

11. The powered tailgate assembly of claim 10, wherein said gate hinge feature includes a fixed cup, a drive cup received within said fixed cup and a drive cup position sensor monitoring a current position of said drive cup and providing current drive cup position data to said controller.

12. The powered tailgate assembly of claim 11, wherein said fixed cup includes a cylindrical wall having a hinge pin passage and said drive cup includes a first hinge pin socket having an open end.

13. The powered tailgate assembly of claim 12, wherein an output of said drive unit is connected to said drive cup and said open end is aligned with said hinge pin passage when said gate hinge feature is in said installation position.

14. The powered tailgate assembly of claim 13, wherein said torque hinge assembly includes a second hinge pin socket carried on a torque rod.

15. The powered tailgate assembly of claim 14, further including a first hinge pin carried on a motor vehicle body adjacent the first end of said tailgate and received and held in said first hinge pin socket of said drive cup and a second hinge pin carried on said motor vehicle body adjacent the second end of said tailgate and received and held in a second hinge pin socket.

16. A method of installing a powered tailgate onto a motor vehicle, comprising:
configuring a controller to displace a gate hinge feature of a powered hinge assembly to an installation position upon connection to a power source; and
orienting, by said controller, said gate hinge feature into said installation position.

17. The method of claim 16, further including: monitoring, by absolute position sensor, a current position of a drive cup of said gate hinge feature;
configuring said controller to respond to current drive cup position data received from said absolute position sensor; and
aligning, by said controller, an open end of a first hinge pin socket of said drive cup with a hinge pin passage in a fixed cup of said gate hinge feature.

18. The method of claim 17, including assembling a torque hinge assembly at a second end of said tailgate by inserting a second hinge pin into a second hinge pin socket.

19. The method of claim 18, including assembling said powered hinge assembly by passing a first hinge pin through said hinge pin passage and said open end in order to insert said first hinge pin into said first hinge pin socket of said drive cup.

20. The method of claim 19, including assembling said torque hinge assembly at a first angular orientation of said tailgate and assembling said powered hinge assembly at a second angular orientation of said tailgate.

* * * * *